(12) United States Patent
Schönberger et al.

(10) Patent No.: US 11,841,194 B2
(45) Date of Patent: Dec. 12, 2023

(54) DIRECTED DECOUPLING BETWEEN BUNDLE AND CORE TUBE IN WOUND HEAT EXCHANGERS

(71) Applicant: LINDE GMBH, Pullach (DE)

(72) Inventors: Manfred Schönberger, Tacherting (DE); Roland Hiller, Garching Alz (DE); Christian Michael Herwerth, Eching (DE)

(73) Assignee: Linde GmbH, Pullach (DE)

( * ) Notice: Subject to any disclaimer, the term of this patent is extended or adjusted under 35 U.S.C. 154(b) by 432 days.

(21) Appl. No.: 17/257,645

(22) PCT Filed: Jun. 24, 2019

(86) PCT No.: PCT/EP2019/025197
§ 371 (c)(1),
(2) Date: Jan. 4, 2021

(87) PCT Pub. No.: WO2020/007502
PCT Pub. Date: Jan. 9, 2020

(65) Prior Publication Data
US 2021/0270535 A1    Sep. 2, 2021

(30) Foreign Application Priority Data
Jul. 4, 2018    (EP) .................................... 18020312

(51) Int. Cl.
*F28D 7/02*   (2006.01)
*B21D 11/06*   (2006.01)
*B21D 53/06*   (2006.01)
*F28F 9/00*   (2006.01)
*F28F 9/013*   (2006.01)
(Continued)

(52) U.S. Cl.
CPC .............. *F28D 7/024* (2013.01); *B21D 11/06* (2013.01); *B21D 53/06* (2013.01); *F28F 9/005* (2013.01); *F28F 9/013* (2013.01); *F28F 9/0132* (2013.01); *B23P 15/02* (2013.01); *F28F 2265/32* (2013.01)

(58) Field of Classification Search
CPC .. B21D 1/06; B21D 1/07; B21D 53/06; B23P 15/26; F28F 9/013; F28F 9/0131; F28D 7/024
See application file for complete search history.

(56) References Cited

U.S. PATENT DOCUMENTS 3,703,028 A    11/1972   Bosquain et al.
3,742,567 A    7/1973    Kaelin
(Continued)

FOREIGN PATENT DOCUMENTS

DE    1939564 A1    2/1970
DE    2055655 A1    5/1971
(Continued)

*Primary Examiner* — Jason L Vaughan
(74) *Attorney, Agent, or Firm* — MILLEN WHITE ZELANO & BRANIGAN, PC; Brion P. Heaney

(57) ABSTRACT

The invention relates to a device (1) for use in the production of a tube bundle (3) of a wound heat exchanger (100), wherein tubes (30) are wound in a plurality of tube layers (4) onto a core tube (300) running in an axial direction (z), webs (10) which run in the axial direction (z) being arranged between the tube layers (4). The invention further relates to a method for producing a tube bundle using said device (1).

20 Claims, 3 Drawing Sheets

Figure 1:
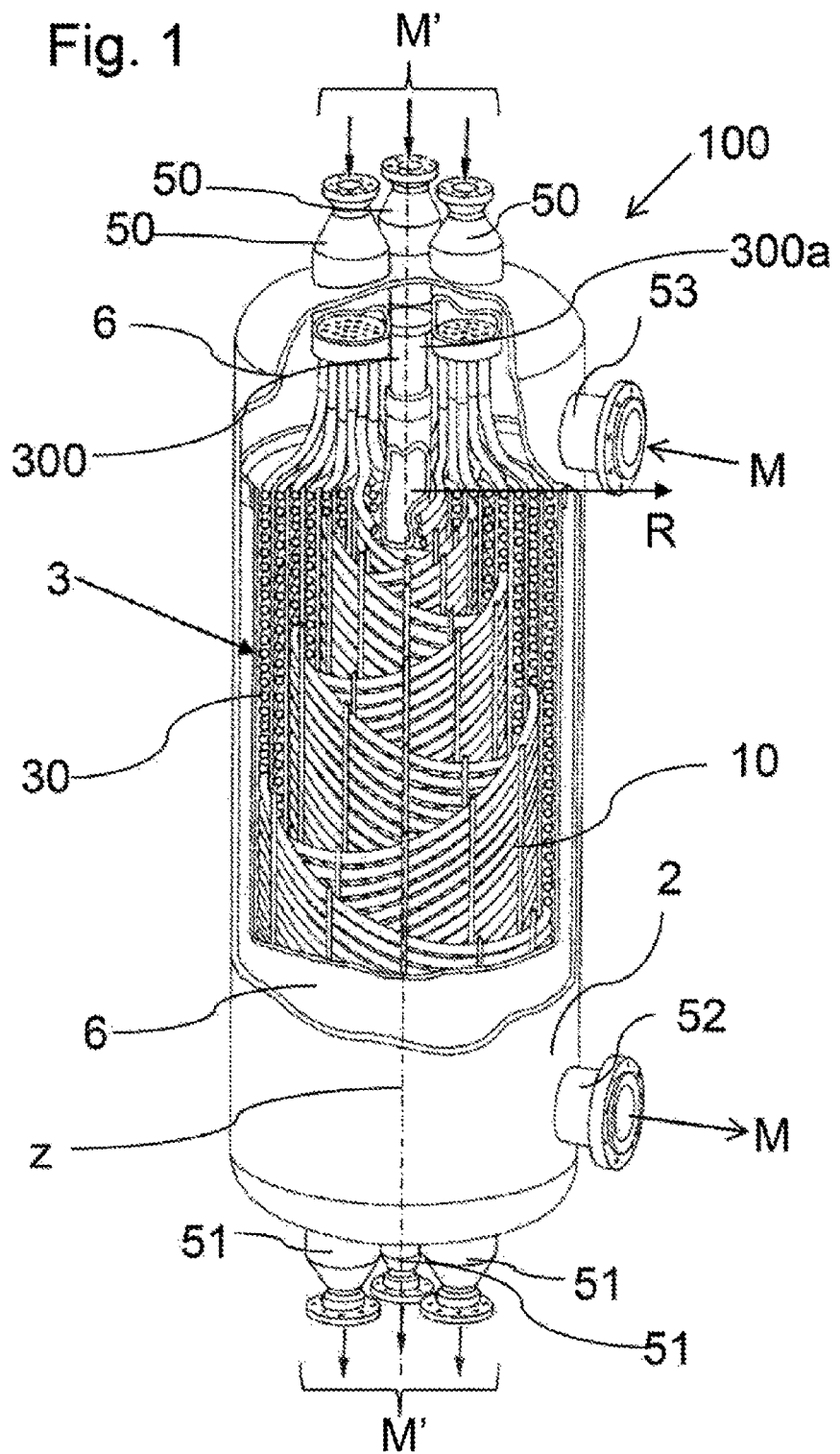

(51) Int. Cl.
     *B23P 15/26*         (2006.01)
     *B23P 15/02*         (2006.01)

(56) References Cited

U.S. PATENT DOCUMENTS

| | | | | |
|---|---|---|---|---|
| 4,190,104 | A | * | 2/1980 | Frei ....................... F28F 9/0131 |
| | | | | 165/162 |
| 4,433,722 | A | * | 2/1984 | Fueglister ............... F28D 7/024 |
| | | | | 165/DIG. 414 |
| 4,552,211 | A | * | 11/1985 | Weber ................... F28F 9/0275 |
| | | | | 165/162 |
| 4,687,052 | A | * | 8/1987 | Fricker ................. F22B 37/205 |
| | | | | 165/DIG. 65 |
| 4,784,219 | A | * | 11/1988 | Hirschle ............... F22B 1/1869 |
| | | | | 165/DIG. 414 |
| 7,458,222 | B2 | * | 12/2008 | Orr ....................... F28F 9/0246 |
| | | | | 165/157 |
| 2006/0005955 | A1 | * | 1/2006 | Orr ........................ F28D 7/024 |
| | | | | 165/108 |

FOREIGN PATENT DOCUMENTS

| | | | |
|---|---|---|---|
| GB | 1023287 | A | 3/1966 |
| GB | 2463482 | A | 3/2010 |
| WO | 2015/063503 | A1 | 5/2015 |

* cited by examiner

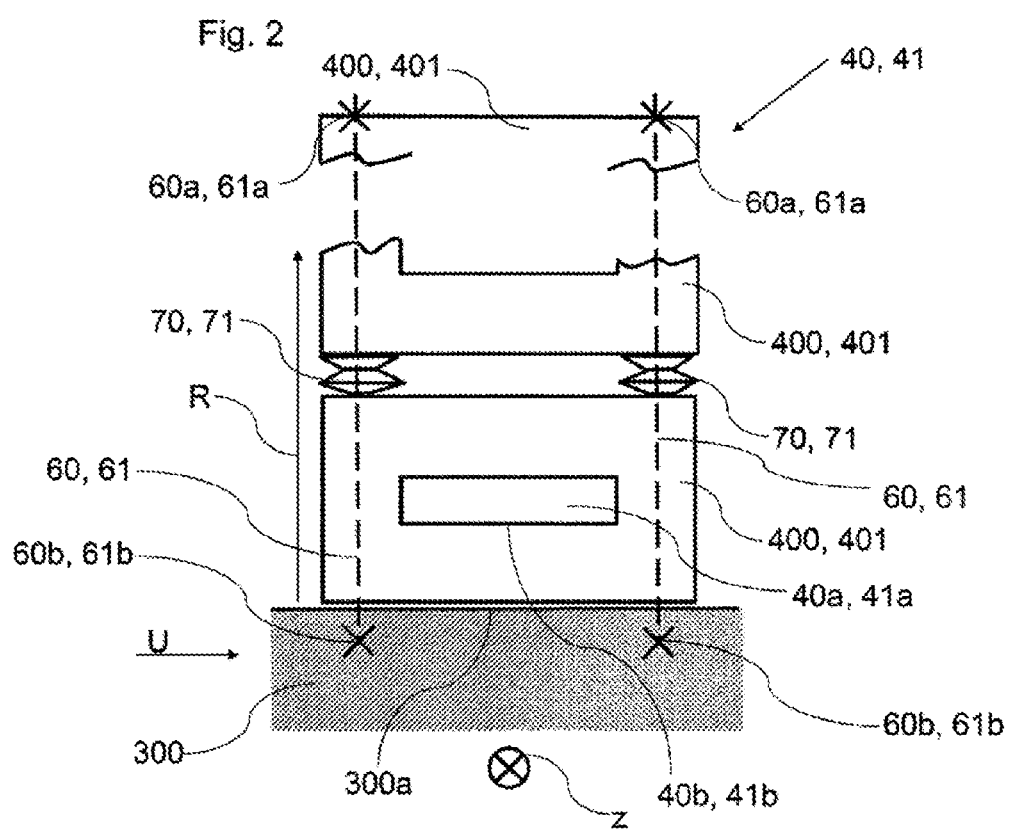

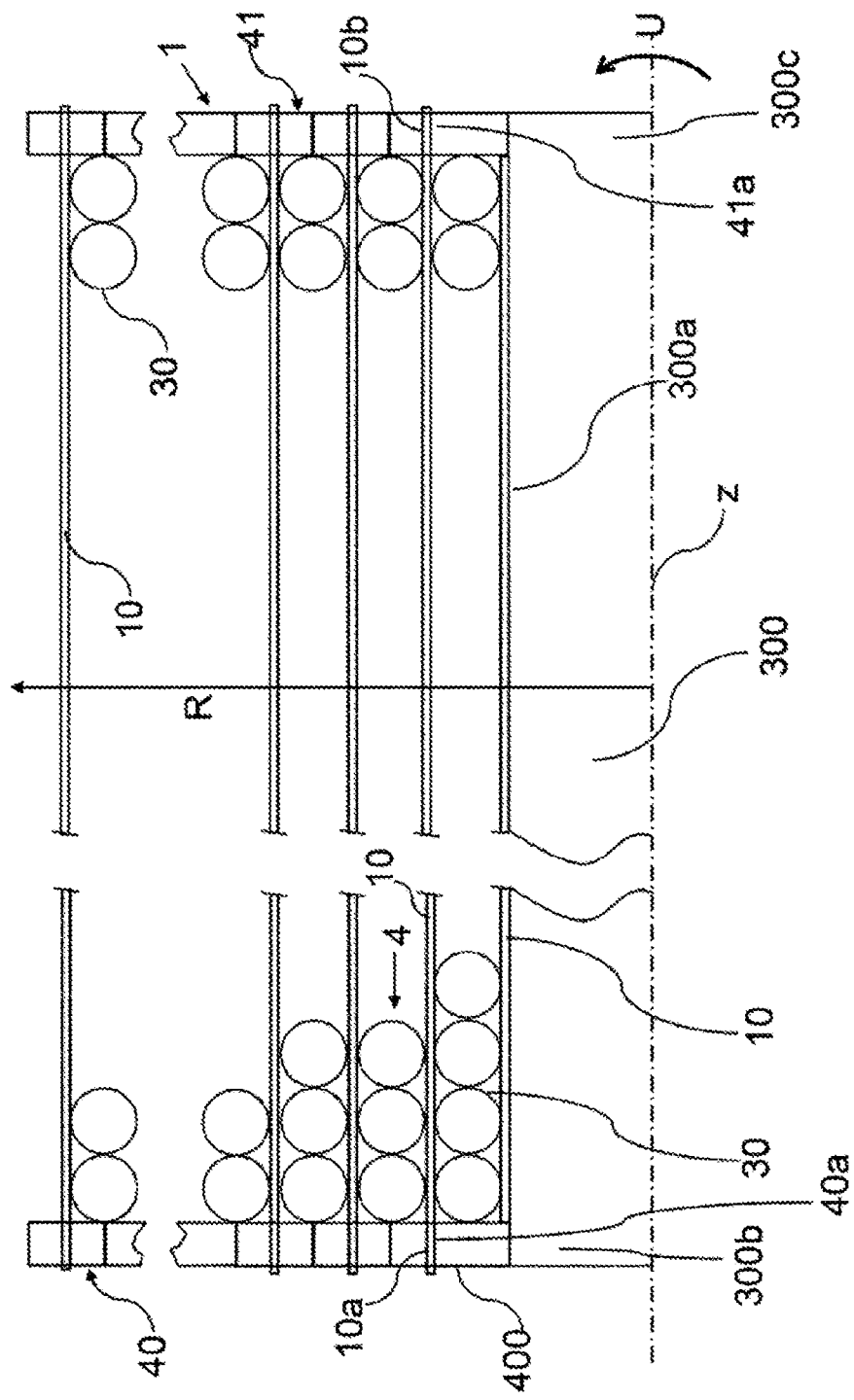

DIRECTED DECOUPLING BETWEEN BUNDLE AND CORE TUBE IN WOUND HEAT EXCHANGERS

The invention relates to a device for use in the production of a tube bundle of a wound heat exchanger and to a method for producing such a tube bundle.

Such wound heat exchangers have a jacket which surrounds a jacket space for receiving a first fluid medium, wherein a core tube is arranged in the jacket space onto which tubes are wound with interposition of webs to form the tube bundle. At least one second fluid medium can be guided in the tube bundle and can thus indirectly exchange heat with the first medium guided in the jacket space. Furthermore, a skirt may be provided which encloses the tube bundle formed by the tubes in order to prevent a bypass flow of the first medium in the jacket space of the heat exchanger past the tube bundle. On the one hand, the core tube has the task of enabling the winding process of the tubes and on the other hand serves to prevent a bypass in the center of the tube bundle. In order to wind the tubes onto the tube bundle, the core tube is usually arranged horizontally, while it runs along the vertical during operation of the heat exchanger.

According to the prior art, it is usually provided that the cohesion of the tube bundle of such a wound heat exchanger is produced by a friction lock between the tubes and the webs or due to a prestressing of the tubes. In addition, the individual tubes are generally fixed to underlying webs by means of brackets. Furthermore, the different web layers can be connected to one another by brackets.

During the winding process, this group rotates about the longitudinal axis or axial direction of the core tube. However, the deflection of the core tube differs from that of the tube bundle. The coupling between the two components or the coupling inside the bundle prevents the relative movements between the tube bundle and the core tube. A shear load is thereby generated, due to which said brackets can rupture in an extreme case. Consequently, this always generates the risk of the bundle opening and the cohesion within the bundle no longer being able to be maintained by said prestressing.

This resulting play can ultimately cause damage to the heat exchanger during production.

The object of the present invention is therefore to provide a device and a method for producing a tube bundle of a wound heat exchanger which enables a coupling of the relative movements between the tube bundle and the core tube.

This object is achieved by a device having the features of claim 1 and by a method having the features of claim 13.

Advantageous developments of these aspects of the invention are specified in the respective dependent claims and are described below.

According to claim 1, a device is disclosed for use in the production of a tube bundle of a wound heat exchanger, wherein during production, tubes are wound in a plurality of tube layers onto a core tube running in an axial direction, and wherein webs which run in the axial direction are arranged between the tube layers.

According to the invention, the device has at least one first and at least one second guide arm, wherein the at least one first guide arm is designed to be fixed to a first end section of the core tube so that the at least one first guide arm projects from the core tube in a radial direction of the core tube, and wherein the at least one second guide arm is designed to be fixed to a second end section of the core tube so that the at least one second guide arm projects from the core tube in a radial direction of the core tube, is opposite the at least one first guide arm in an axial direction of the core tube, and in so doing runs parallel to the at least one first guide arm, and wherein the at least one first and the at least one second guide arm are designed to hold a plurality of webs of the tube bundle of the heat exchanger arranged one above the other in a radial direction so that the respective web is displaceably mounted in an axial direction of the core tube in the at least one first and the at least one second guide arm.

The radial direction is in each case perpendicular to and faces away from the axial direction or longitudinal axis of the core tube. Moreover, the first end section is opposite the second end section of the core tube in the axial direction of the core tube. That is, the core tube runs in the axial direction from the first end section to the second end section.

The primary feature of the device according to the invention does not seek to prevent the tearing of bracket seams but rather to prevent the tube bundle as a whole from coming apart so that the risk of resulting damage to the tube bundle is reduced. For this reason, the device enables a directed coupling of the relative movements between the tube bundle and the core tube. For this purpose, the device according to the invention is configured, in particular, to permit thrust movements by a longitudinal guide of the webs in the axial direction of the core tube, in particular after brackets break off which cause a rigid connection between tubes and webs, wherein the cohesion in a radial direction of the core tube can in particular be maintained at the same time so that an offset between tube layers and webs is prevented.

The bundle tubes thus remain substantially free of play so that the tubes are not damaged during the further winding process.

According to one embodiment of the device according to the invention, the at least one first guide arm runs in a direction of extension which coincides with the radial direction of the core tube when the at least one first guide arm is fixed as intended to the first end section of the core tube, wherein the at least one first guide arm has a plurality of openings which are arranged next to one another (preferably equidistantly) in the direction of extension and which are each designed to receive a first end section of an assigned web of said plurality of webs of the tube bundle so that the respective first end section of such a web is displaceably arranged in the assigned opening in the axial direction.

Moreover, according to one embodiment, the at least one second guide arm also runs in a direction of extension which coincides with the radial direction of the core tube when the at least one second guide arm is fixed as intended to the second end section of the core tube, wherein the at least one second guide arm has a plurality of openings which are arranged next to one another (preferably equidistantly) in the direction of extension and which are each designed to receive a second end section of a web of said plurality of webs of the tube bundle so that the respective second end section of such a web is displaceably arranged in the assigned opening in the axial direction.

Furthermore, according to one embodiment, the respective opening of the at least one first guide arm is designed to respectively receive in a form fit a first end section of a web of the tube bundle. Furthermore, one embodiment provides that the respective opening of the at least one second guide arm is also designed to receive in a form fit a second end section of a web of the tube bundle.

Furthermore, one embodiment of the device according to the invention provides that the at least one first guide arm is designed to prevent or limit a movement of the respective first end section of the respective web of said plurality of webs in a radial direction of the core tube. Furthermore, it is provided according to one embodiment that the at least one second guide arm is also designed to prevent or limit a movement of the respective second end section of the respective web of said plurality of webs in a radial direction of the core tube.

For the fixation or the controlled limitation of a movement of the webs in the radial direction of the core tube, an embodiment of the device according to the invention provides that the at least one first guide arm has a plurality of bearing bodies, wherein each bearing body of the at least one first guide arm has one of said openings of the at least one first guide arm. Furthermore, one embodiment provides that the at least one second guide arm also has a plurality of bearing bodies for this purpose, wherein each bearing body of the at least one second guide arm has one of said openings of the at least one second guide arm.

In order to improve sliding of the webs in the respectively assigned openings, a further embodiment may provide that a surface of the respective bearing body bordering the respective opening is formed by a friction-reducing material.

Furthermore, one embodiment of the device according to the invention provides that this material is polytetrafluoroethylene (PTFE for short, CAS number 9002-84-0) or that said material has PTFE.

Furthermore, one embodiment of the device according to the invention provides that the bearing bodies of the at least one first guide arm are connected to one another in the direction of extension of the at least one first guide arm, and/or that the bearing bodies of the at least one second guide arm are connected to one another in the direction of extension of the at least one second guide arm.

Furthermore, an embodiment of the device according to the invention provides that the bearing bodies of the at least one first guide arm are connected to one another via at least one tensioning element running in the direction of extension of the at least one first guide arm, or via two parallel tensioning elements running in the direction of extension of the at least one first guide arm. In an analogous manner, an embodiment can provide that the bearing bodies of the at least one second guide arm are connected to one another via at least one tensioning element running in the direction of extension of the at least one second guide arm, or via two parallel tensioning elements running in the direction of extension of the at least one second guide arm.

Furthermore, one embodiment of the device according to the invention provides that at least one spring element or two spring elements are provided between two adjacent bearing bodies each of the at least one first guide arm so that the respective two adjacent bearing bodies can be displaced relative to one another in the direction of extension of the at least one first guide arm (in particular while generating a corresponding restoring force). Correspondingly, according to one embodiment, at least one spring element or two spring elements are provided between two adjacent bearing bodies each of the at least one second guide arm so that the respective two adjacent bearing bodies of the at least one second guide arm can be displaced relative to one another in the direction of extension of the at least one second guide arm (in particular while generating a corresponding restoring force).

Furthermore, according to one embodiment of the device according to the invention, the device has a plurality of first guide arms and a corresponding plurality of second guide arms, wherein the first guide arms are designed to be fixed to a first end section of the core tube so that the respective first guide arm projects in a radial direction from the core tube, and the first guide arms are arranged next to one another in a circumferential direction of the core tube, and wherein the second guide arms are designed to be fixed to a second end section of the core tube so that the respective second guide arm projects in a radial direction from the core tube and the second guide arms are arranged next to one another in the circumferential direction of the core tube, and wherein the first and second guide arms are designed to be fixed to the core tube such that precisely one assigned second guide arm is opposite each first guide arm in the axial direction of the core tube and runs parallel to the first guide arm, and wherein the respective first guide arm and the second guide arm opposite the respective first guide arm in the axial direction are designed to hold a plurality of webs of the tube bundle of the heat exchanger arranged one above the other in a radial direction so that the respective web is displaceably mounted in an axial direction of the core tube in the assigned first guide arm and the assigned second guide arm.

The individual first and second guide arms can in turn each be designed like the at least one first or the at least one second guide arm described above.

The at least one first guide arm or the plurality of first guide arms of the device according to the invention can each be designed to be respectively connected to the core tube via a welded connection. It is also preferably provided that the at least one second guide arm or the plurality of second guide arms of the device according to the invention are each designed to be respectively connected to the core tube via a welded connection. The device according to the invention is furthermore preferably removed again after the tube bundle has been wound and in particular does not constitute a component of the finished heat exchanger.

A further aspect of the present invention relates to a method according to claim 12 for producing a tube bundle for a wound heat exchanger using a device according to the invention, wherein a core tube running in an axial direction is provided, and wherein the at least one first guide arm is fixed to a first end section of the core tube such that the at least one first guide arm projects from the core tube in a radial direction of the core tube, and wherein the at least one second guide arm is fixed to a second end section of the core tube such that the at least one second guide arm projects from the core tube in a radial direction of the core tube, is opposite the at least one first guide arm in an axial direction of the core tube, and in so doing runs parallel to the at least one first guide arm, and wherein tubes for forming several tube layers lying one above the other in a radial direction of the core tube are wound onto the core tube, wherein at least one web is arranged between two adjacent tube layers each and in particular between the core tube and an innermost tube layer in a radial direction of the core tube, runs in the axial direction of the core tube, and is displaceably mounted in the axial direction in the two guide arms.

According to one embodiment of the method according to the invention, the guide arms or the device are removed from the core tube after the production of the tube bundle.

Furthermore, one embodiment of the method according to the invention provides for the respective first end section of the respective web to be arranged in the assigned opening of the at least one first guide arm, namely in particular in a form fit, and/or for the respective second end section of the respective web to be arranged in the assigned opening of the at least one second guide arm, namely in particular in a form fit.

Furthermore, according to an embodiment of the method according to the invention, the device has a plurality of first guide arms and a corresponding plurality of second guide arms, wherein the first guide arms are fixed to a first end section of the core tube so that the respective first guide arm projects from the core tube in a radial direction of the core tube, and the first guide arms are arranged next to one another in a circumferential direction of the core tube, and wherein the second guide arms are fixed to a second end section of the core tube so that the respective second guide arm projects from the core tube in a radial direction of the core tube, and the second guide arms are arranged next to one another in the circumferential direction of the core tube, and wherein the first and second guide arms are fixed to the core tube such that precisely one assigned second guide arm is opposite each first guide arm in the axial direction of the core tube and runs parallel to the first guide arm, and wherein tubes for forming several tube layers lying one above the other in a radial direction of the core tube are wound onto the core tube, wherein at least a number of webs corresponding to the number of the first or second guide arms is arranged between two adjacent tube layers each and in particular between the core tube and an innermost tube layer in a radial direction of the core tube, wherein the webs each run in the axial direction of the core tube, and wherein the respective web is displaceably mounted in the axial direction in the assigned first guide arm and in the assigned second guide arm.

In this case, at the end of the winding process, the webs that are assigned to the same first and second guide arms or are held by them are arranged one above the other in the radial direction of the core tube.

Further details and advantages of the invention are to be explained by the following description of figures of an exemplary embodiment with reference to the figures. Shown are:

FIG. 1 a partially sectional view of a wound heat exchanger;

FIG. 2 a first and second guide arm of another embodiment of a heat exchanger according to the invention; and FIG. 3 a schematic view of a core tube with guide arms fixed thereto.

FIGS. 2 and 3 show a device 1 according to the invention which, when winding a tube bundle 3 onto a core tube 300 of a wound heat exchanger 100, as shown for example in FIG. 1, is used to hold the tube bundle 3 together in a radial direction R of the tube bundle 3 or the core tube 300 during winding of the tube bundle 3, and at the same time to permit longitudinal guidance of the webs 10 of the tube bundle 3 in an axial direction z of the core tube 300. The radial direction R is in each case perpendicular to the axial direction z or longitudinal axis z along which the core tube 300 runs, and faces away from the axial direction z or longitudinal axis z.

As shown by way of example in FIG. 1, a wound heat exchanger 1 generally has a jacket 2 which runs along the longitudinal axis z (which is vertical during operation) and surrounds a jacket space 6 of the heat exchanger 1 which serves to receive a first fluid medium M.

The heat exchanger 1 furthermore has the tube bundle 3 arranged in the jacket space. The tube bundle 3 can have a plurality of tubes 30 for receiving at least one second fluid medium M', wherein the tubes 30 are wound helically, in particular at least in sections, onto the core tube 300 of the heat exchanger 1 which runs along the longitudinal axis z or in the axial direction z in the jacket space 6 so that the tube bundle 3 has one or more tube layers 4 arranged one above the other in the radial direction R of the core tube 300 or the tube bundle 3. As is further indicated in FIG. 1, the tubes 30 are wound onto an outer side 300*a* of the core tube 300 with the interposition of webs 10. Furthermore, connecting pieces 52, 53 which are fluidically connected to the jacket space 6 are provided on the jacket 2 and serve to introduce or withdraw the first medium M. The first medium M can be guided in the jacket space 6 from top to bottom or from bottom to top.

Furthermore, connecting pieces 50, 51 which are fluidically connected to the tube bundle 3 are provided on the jacket 2 via which the at least one second medium M' can be introduced into or withdrawn from the tube bundle 3. The second medium M' guided in the tube bundle 3 can thus exchange heat indirectly with the first medium M' guided in the jacket space 6. The at least one second medium M' can also be guided in the tube bundle 3 from top to bottom or from bottom to top. Furthermore, the tubes 30 can be divided into tube groups (FIG. 1 shows three such tube groups) which can be supplied separately with a second medium M' (in particular also different media). In order to prevent a bypass flow of the first medium M past the tube bundle 3 in the jacket space 6, the tube bundle 3 can be surrounded by a skirt 7.

FIGS. 2 and 3 show how, when winding the tube bundle 3, the webs 10 of the tube bundle 3 can be held or guided by means of a device 1 according to the invention such that a necessary cohesion of the tube bundle 3 can be ensured during winding of the tube bundle 3.

For this purpose, the device 1 has at least one first and at least one second guide arm 40, 41. A plurality of first guide arms 40 and a corresponding number of second guide arms 41 are preferably provided in each case. The individual first and second guide arms 40, 41 can be designed as in FIG. 2.

The first guide arms 40 of the device 1 are designed to be fixed to a first end section 300*b* of the core tube 300 so that the first guide arms 40 project from the core tube 300 in a radial direction R of the core tube 300 and are arranged next to one another (in particular equidistantly) in the circumferential direction U of the core tube 300. Furthermore, the second guide arms 41 of the device 1 are designed to be fixed to a second end section 300*c* of the core tube 300 so that the second guide arms 40 project from the core tube 300 in a radial direction R of the core tube 300 and are arranged next to one another (in particular equidistantly) in the circumferential direction U of the core tube 300. In this case, a second guide arm 41 is assigned to each first guide arm 40, wherein these respectively mutually assigned guide arms 40, 41 are opposite one another in the axial direction z of the core tube 300 and run parallel to one another.

This is shown in FIG. 3 by means of a schematic section of the core tube 300 as well as a first and an opposite parallel second guide arm 40, 41.

The respective two mutually assigned guide arms 40, 41 are now designed to hold a plurality of webs 10 of the tube bundle 3 of the heat exchanger 100 arranged one above the other in a radial direction R of the core tube 300 so that the respective web 10 is displaceably mounted in the two guide arms 40, 41 in an axial direction z of the core tube 300, wherein in particular, a movement of the webs 10 is prevented or restricted in the radial direction R.

This protects the tube bundle 3 during production in the following manner. In order to produce the tube bundle 3, the tubes 30 are wound helically onto the horizontally arranged core tube 300 (in particular with the interposition of webs 10 fixed or welded to the core tube 10) by rotating the latter about the axial (horizontal) direction z or longitudinal axis z. As soon as a tube layer 4 is completely wound, webs 10 running in the axial direction z are arranged thereon and each run in the radial direction R above the webs 10 arranged beforehand. The webs 10 are each arranged with their first end sections in an opening 40*a* of the assigned first guide arm 40 and in an opening 41*a* of the assigned second guide arm 41. The next tube layer 4 is then applied to these webs 10. When rotating the tube bundle 3 about the longitudinal axis z of the core tube 300 during the winding process, the guide arms 40, 41 hold the tubes 30 together in the radial direction but allow a displacement of the webs 10 in the guide arms 40, 41 in the axial direction z (for example, due to a deflection of the core tube 300, of the tube bundle 3, and of the webs 10) during the winding process. This ensures sufficient cohesion of the tube bundle 3 during winding.

After the end of the winding process, the guide arms 40, 41 or the device 1 are again removed from the core tube 300.

The tube bundle 3 together with the core tube 300 can then be arranged in the jacket space 6 of the jacket 2 (without the device 1).

As shown in FIG. 2, the respective first guide arm 40 (the second guide arms can be designed identically) can have a plurality of bearing bodies 400 in which the respective opening 40*a* for receiving the first end sections 10*a* of the webs 10 can be formed (the second guide arms correspondingly receive the second end sections 10*b* of the assigned webs 10).

The bearing bodies 400 can be connected to one another via tensioning elements. Spring elements 70 can be arranged between two adjacent bearing bodies 400 each and can permit controlled, limited movement of the web end sections 10*a* in the radial direction R. In order to more easily slide the webs 10 in the openings 40*a*, they may have a surface 40*b* consisting of a friction-reducing material, such as PTFE.

The first guide arms 40 can furthermore be temporarily fixed to the outside 300*a* of the core tube 300 via a connection 60*b*, in particular via welded connections 60*b* between the tensioning elements 60 and the core tube 300.

The tensioning element 60 of the respective first guide arm 40 can be guided through corresponding through-openings in the bearing bodies 400, wherein the outermost bearing body 400 in a radial direction R is fixed to the corresponding tensioning elements 60 via a respective suitable connection 60*a*, e.g., a welded connection.

The tensioning elements 60 of the respective first guide arm 40 may also be passed through the spring elements 70 to hold them between the bearing bodies 400.

| List of reference signs | |
|---|---|
| 1 | Heat exchanger |
| 2 | Jacket |
| 3 | Tube bundle |
| 4 | Tube layers |
| 6 | Jacket space |
| 7 | Skirt |
| 10 | Web |
| 30 | Tube |
| 40 | First guide arm |
| 41 | Second guide arm |
| 40a, 41a | Openings |
| 40b, 41b | Surface |
| 50, 51, 52, 53 | Connecting piece |
| 60 | Tensioning element |
| 60a, 60b | Connection, in particular welded connection |
| 61 | Tensioning element |
| 61a, 61b | Connection, in particular welded connection |
| 70 | Spring element |
| 71 | Spring element |

| List of reference signs | |
|---|---|
| 300 | Core tube |
| M | First medium |
| M' | Second medium |
| R | Radial direction |
| U | Circumferential direction |
| Z | Axial direction or longitudinal axis |

The invention claimed is:

1. A device (1) for use in production of a tube bundle (3) of a wound heat exchanger (100), wherein tubes (30) are wound in a plurality of tube layers (4) onto a core tube (300) running in an axial direction (z), with a plurality of webs (10) running in the axial direction (z), said webs being arranged between the tube layers (4), said device comprising:

at least one first and at least one second guide arm (40, 41), wherein the at least one first guide arm (40) is designed to be fixed to a first end section (300*b*) of the core tube so that the at least one first guide arm (40) projects from the core tube (300) in a radial direction (R) of the core tube (300), and wherein the at least one second guide arm (41) is designed to be fixed to a second end section (300*c*) of the core tube (300) so that the at least one second guide arm (41) projects from the core tube (300) in a radial direction (R) of the core tube (300), and the at least one second guide arm (41) is opposite the at least one first guide arm (40) in an axial direction (z) of the core tube (300), and in so doing runs parallel to the at least one first guide arm (40), and wherein the at least one first and the at least one second guide arm (40, 41) are capable of holding a plurality of said webs (10) of the tube bundle (3) of the heat exchanger (100) arranged one above the other in a radial direction (R) of the core tube so each web (10) can be displaceably mounted in an axial direction (z) of the core tube (300) in the at least one first and the at least one second guide arm (40, 41).

2. The device according to claim 1, wherein the at least one first guide arm (40) runs in a direction of extension (R) which coincides with the radial direction (R) of the core tube (300) when the at least one first guide arm (40) is fixed to the first end section (300*b*) of the core tube (300), wherein the at least one first guide arm (40) has a plurality of openings (40*a*) which are arranged next to one another in the direction of extension (R) and which are each designed to receive a first end section (10*a*) of an assigned web (10) of the tube bundle (3), and/or that the at least one second guide arm (41) runs in a direction of extension (R) which coincides with the radial direction (R) of the core tube (300) when the at least one second guide arm (41) is fixed to the second end section (300*c*) of the core tube (300), wherein the at least one second guide arm (41) has a plurality of openings (41*a*) which are arranged next to one another in the direction of extension of the at least one second guide arm (41) and which are each designed to receive a second end section (10*b*) of an assigned web (10) of the tube bundle.

3. The device according to claim 2, wherein the respective opening (40*a*) of the at least one first guide arm (40) is designed to respectively receive in a form fit the first end section (10*a*) of an assigned web (10) of the tube bundle (3), and/or that the respective opening (41*a*) of the at least one second guide arm (41) is designed to respectively receive in a form fit the second end section (10*b*) of an assigned web (10) of the tube bundle (3).

4. The device according to claim 2, wherein the at least one first guide arm (40) is designed to prevent or limit a movement of the respective first end section (10a) of the respective web (10) in a radial direction (R) of the core tube (300), and/or that the at least one second guide arm (41) is designed to prevent or limit a movement of the respective second end section (10b) of the respective web (10) in a radial direction (R) of the core tube (300).

5. The device according to claim 2, wherein the at least one first guide arm (40) has a plurality of bearing bodies (400), wherein each bearing body (400) of the at least one first guide arm (40) has one of said openings (40a) of the at least one first guide arm (40), and/or that the at least one second guide arm (41) has a plurality of bearing bodies (401), wherein each bearing body (401) of the at least one second guide arm (41) has one of said openings (41a) of the at least one second guide arm (41).

6. The device according to claim 5, wherein a surface (40b, 41b) of the respective bearing body (400, 401) bordering the respective opening (40a, 41a) is formed by a friction-reducing material.

7. The device according to claim 6, wherein the friction-reducing material is PTFE.

8. The device according to claim 5, wherein the bearing bodies (400) of the at least one first guide arm (40) are connected to one another, and/or that the bearing bodies (401) of the at least one second guide arm (41) are connected to one another.

9. The device according to claim 8, wherein the bearing bodies (400) of the at least one first guide arm (40) are connected to one another via at least one tensioning element (60) running in the direction of extension (R) of the at least one first guide arm (40) or two parallel tensioning elements (60) running in the direction of extension (R) of the at least one first guide arm (40), and/or that the bearing bodies (401) of the at least one second guide arm (41) are connected to one another via at least one tensioning element (61) running in the direction of extension (R) of the at least one second guide arm (41) or via two parallel tensioning elements (61) running in the direction of extension (R) of the at least one second guide arm (41).

10. The device according to claim 5, wherein at least one spring element (70) or two spring elements (70) are provided between two adjacent bearing bodies (400) each of the at least one first guide arm (40) so that the respective two adjacent bearing bodies (400) can be displaced relative to one another in the direction of extension (R) of the at least one first guide arm (40), and/or that at least one spring element (71) or two spring elements (71) are provided between two adjacent bearing bodies (401) each of the at least one second guide arm (41) so that the respective two adjacent bearing bodies (401) of the at least one second guide arm (41) can be displaced relative to one another in the direction of extension (R) of the at least one second guide arm (41).

11. The device according to claim 1, wherein the device (1) has a plurality of first guide arms (40) and a corresponding plurality of second guide arms (41), wherein the first guide arms (40) are designed to be fixed to the first end section (300b) of the core tube (300) so that the respective first guide arms (40) projects from the core tube (300) in a radial direction (R) of the core tube (300) and the first guide arms (40) are arranged next to one another in a circumferential direction (U) of the core tube (300), and wherein the second guide arms (41) are designed to be fixed to the second end section (300c) of the core tube (300) so that the respective second guide arms (41) projects from the core tube (300) in a radial direction (R) of the core tube (300) and the second guide arms (41) are arranged next to one another in the circumferential direction (U) of the core tube (300), and wherein the first and second guide arms (40, 41) are designed to be fixed to the core tube (300) such that precisely one assigned second guide arm (41) is opposite each first guide arm (40) in the axial direction (z) of the core tube (300) and runs parallel to the respective first guide arm (40), and wherein the respective first guide arm and the respective second guide arm (41) opposite the respective first guide arm (40) in the axial direction (z) are designed to hold the plurality of webs (10) of the tube bundle (3) of the heat exchanger (100) arranged one above the other in a radial direction (R) of the core tube (300) so that each web (10) is displaceably mounted in an axial direction (z) of the core tube (300) in the respective two guide arms (40, 41).

12. A method for producing a tube bundle (3) for a wound heat exchanger (100) using a device (1) according to claim 1, comprising:
providing the core tube (300) running in an axial direction (z),
fixing the at least one first guide arm (40) to the first end section (300b) of the core tube (300) such that the at least one first guide arm (40) projects from the core tube (300) in a radial direction (R) of the core tube (300),
fixing the at least one second guide arm (41) to the second end section (300c) of the core tube (300) such that the at least one second guide arm (41) projects from the core tube (300) in a radial direction (R), and the at least one second guide arm (41) is opposite the at least one first guide arm (40) in an axial direction (z) of the core tube (300), and runs parallel to the at least one first guide arm (40), and
winding tubes (30) for forming several tube layers (4) lying one above the other in a radial direction (R) of the core tube (300) onto the core tube (300),
wherein at least one web is arranged between each two adjacent tube layers, said at least one web runs in the axial direction (z), and is displaceably mounted in the axial direction (z) in the at least one first and the at least one second guide arm (40, 41).

13. The device according to claim 1, wherein the at least one first guide arm (40) runs in a direction of extension (R) which coincides with the radial direction (R) of the core tube (300) when the at least one first guide arm (40) is fixed to the first end section (300b) of the core tube (300), wherein the at least one first guide arm (40) has a plurality of openings (40a) which are arranged next to one another in the direction of extension (R) and which are each designed to receive a first end section (10a) of an assigned web (10) of the tube bundle (3).

14. The device according to claim 13, wherein the respective opening (40a) of the at least one first guide arm (40) is designed to respectively receive in a form fit the first end section (10a) of an assigned web (10) of the tube bundle (3).

15. The device according to claim 13, wherein the at least one first guide arm (40) is designed to prevent or limit a movement of the respective first end section (10a) of the respective web (10) in a radial direction (R) of the core tube (300).

16. The device according to claim 13, wherein the at least one first guide arm (40) has a plurality of bearing bodies (400), wherein each bearing body (400) of the at least one first guide arm (40) has one of said openings (40a) of the at least one first guide arm (40).

17. The device according to claim 1, wherein the at least one second guide arm (41) runs in a direction of extension (R) which coincides with the radial direction (R) of the core tube (300) when the at least one second guide arm (41) is fixed to the second end section (300c) of the core tube (300), wherein the at least one second guide arm (41) has a plurality of openings (41a) which are arranged next to one another in the direction of extension of the at least one second guide arm (41) and which are each designed to receive a second end section (10b) of an assigned web (10) of the tube bundle.

18. The device according to claim 17, the respective opening (41a) of the at least one second guide arm (41) is designed to respectively receive in a form fit the second end section (10b) of an assigned web (10) of the tube bundle (3).

19. The device according to claim 17, wherein the at least one second guide arm (41) is designed to prevent or limit a movement of the respective second end section (10b) of the respective web (10) in a radial direction (R) of the core tube (300).

20. The device according to claim 17, wherein the at least one second guide arm (41) has a plurality of bearing bodies (401), wherein each bearing body (401) of the at least one second guide arm (41) has one of said openings (41a) of the at least one second guide arm (41).

* * * * *